2,779,025

NEW POLYMERIC MATERIAL CONTAINING COPOLYMERIZED MONOCHLOROTRIFLUOROETHYLENE AND AN ALKYL VINYL ETHER

Russell W. Perry, Akron, Ohio, assignor to The Firestone Tire & Rubber Company, Akron, Ohio, a corporation of Ohio No Drawing. Application August 27, 1953,
Serial No. 376,963

8 Claims. (Cl. 2—167)

This invention relates to a new polymeric material containing copolymerized therein at least 50 percent by weight of a copolymer of monochlorotrifluoroethylene (hereinafter called CTFE) and an alkyl vinyl ether, the content of ether being not greater than one mole thereof for each mole of CTFE, and the ratio of alkyl vinyl ether and CTFE used in the preparation of the polymeric material being 0.1 to 0.9 mole of the ether to each 0.9 to 0.1 mole of the CTFE. The invention includes the graft polymer formed by grafting vinyl chloride on to such copolymer, the vinyl chloride constituting up to 50 percent of the graft copolymer. A preferred form of the polymeric material is sufficiently flexible at room temperature, as for example, at 25° C., to be used for coating gloves and for protective clothing, especially for protection against corrosive acids such as nitric, and in this preferred form the alkyl group of the ether contains 3 to 9 carbon atoms. For performance at low temperatures copolymers containing alkyl vinyl ethers in which the alkyl groups contain 6 to 9 carbon atoms are more especially preferred. The copolymer of CTFE and the alkyl ether, graft copolymers thereof formed by polymerizing vinyl chloride thereon, and, more particularly, latexes thereof, and objects coated with the aforesaid polymeric materials and particularly flexible base materials are claimed herein as new. There is also claimed herein the process of dipping base materials in a latex of any of the foregoing.

THE COPOLYMER

Various alkyl vinyl ethers may be used in making the copolymer. The alkyl vinyl ether copolymer is less stiff than polymerized CTFE; and, generally speaking, the straighter the alkyl chain of the ether the less stiff the copolymer. The effectiveness of the alkyl vinyl ether as a plasticizer in the copolymer increases from the propyl vinyl ether to the nonyl vinyl ether, but the copolymers formed from the higher molecular weight ethers are somewhat less desirable in physical properties than the copolymers formed from the lower molecular weight ethers. For coating fabrics and other flexible base materials, alkyl vinyl ethers containing three to nine carbon atoms in the alkyl group are employed. Copolymers of the methyl and ethyl vinyl ethers may be formed but are relatively stiff. They may be used for coating wood and other stiff base materials. Alkyl vinyl ethers having alkyl groups containing over nine carbon atoms tend to be wax like. The n-octadecyl vinyl ether has pronounced waxy properties. It has desirable properties as a coating but is not recommended for use in the preparation of acid-resistant clothing. The copolymer formed from n-butyl vinyl ether is highly resistant to fuming nitric acid. It is somewhat stiff at low temperatures. The copolymer from 2-ethylhexyl vinyl ether is less stiff at low temperatures. The alkyl vinyl ether content of the copolymer cannot exceed one molecular equivalent for each molecular equivalent of CTFE. However, the charging ratio may vary from 0.1 to 0.9 mole percent of alkyl vinyl ether to 0.9 to 0.1 mole of CTFE. The higher the CTFE content of the copolymer, the greater its resistance to acid.

In connection with charging ratios cited above, it should be observed that vinyl ethers do not homopolymerize in free-radical-catalyzed systems; and CTFE polymerizes only relatively slowly in such systems. The monomer pair of the present invention are unusual in that notwithstanding their individual reluctance to polymerize they polymerize together at an extremely rapid rate, this effect being most pronounced when the monomers are supplied to the reaction in approximately equimolecular proportions, say 0.4 to 0.6 mole of vinyl ether for each 0.6 to 0.4 mole of CTFE.

GRAFT COPOLYMER

The term "graft copolymer" is used herein to mean a high polymer the molecules of which consist of two or more polymeric parts of different composition chemically united together.

The graft copolymers of this invention are generally prepared by polymerizing vinyl chloride in the presence of a latex prepared by copolymerizing CTFE and an alkyl vinyl ether, as described above. The products obtained retain their resistance to acid without substantial decrease, and the film-forming properties of the product are improved. Films formed from copolymers of CTFE and the higher alkyl vinyl ethers tend to be somewhat tacky and weak although they have excellent low temperature properties. Modification of such copolymers by grafting vinyl chloride thereon produces polymeric material from which may be produced films which are tougher and tack free and which still have good low temperature properties. Thus, graft polymerizing vinyl chloride onto the copolymer formed with 2-ethylhexyl vinyl ether gives a product which has good film-forming properties and which at low temperatures (such as —20° C.) is sufficiently flexible for comfortable use on wearing apparel such as gloves, etc. The graft copolymer for coating apparel, etc. preferably contains 10 to 25 percent by weight of vinyl chloride on substantially 90 to 75 percent of copolymer obtained by polymerizing 0.25 to 0.50 molar equivalent of alkyl vinyl ether of three to nine carbon atoms with 0.75 to 0.50 molar equivalent of CTFE. With copolymers of higher molecular weight alkyl vinyl ethers a higher percentage of vinyl chloride may be used than with a copolymer of lower molecular weight. The preferred graft copolymer for acid-resistant coatings is obtained by first copolymerizing equimolar parts of the alkyl vinyl ether and CTFE. In graft polymers used for other purposes the possible variation in the molecular weight of the ethers is greater, and the vinyl chloride content may vary over a greater range.

In place of vinyl chloride, other monomers are operative in the grafting operation, such as vinyl acetate, vinylidene chloride, methyl methacrylate, acrylonitrile, styrene and other ethenically unsaturated monomers.

PREPARATION OF COPOLYMER

The copolymers are normally made in an emulsion system using a free-radical type catalyst. The reaction is exothermic and proceeds at a very rapid rate. To prevent it from getting out of control the copolymerization is advantageously started at about 105° F. and then cooled to 90° F. after the induction period. Increment addition of the CTFE can be used as a method of temperature control, and this technique may result in a reduction in the production of prefloc. It appears to be advantageous to use a mixture of emulsifiers to reduce prefloc. A buffer is desirable to prevent pH shift.

APPLICATIONS OF COPOLYMER AND GRAFT COPOLYMER

The copolymer and graft copolymer may be applied to a variety of substrates, either from latex or from solution. The latex may be used directly for the production of continuous coatings, thus avoiding the use of solvents. Thus these polymers may be used for coating cloth, paper, wood, etc., and may also be used for preparing laminates from such materials. One of the more promising applications appears to be a preparation of coated fabrics for acid-resistant clothing. Fabrics coated with the above described polymers are flexible, abrasion resistant, and have a high degree of resistance to such corrosive reagents as red fuming nitric acid and other corrosive inorganic chemicals. For dipping, a solids content of 40 to 60 percent of the coplymer or graft copolymer is preferred, and this solids content may be achieved by polymerization direct to this solids content, or by concentrating a latex of lower solids content. The unreacted CTFE and alkyl vinyl ether are advantageously stripped from the latex before the apparel or the like is dipped into it. Unless the unused monomers are removed, deposits produced by the latex do not adhere properly and tend to bubble. If the coating is applied from a latex, the latex is preferably thickened with a conventional thickener, such as polyvinyl alcohol or methyl cellulose. The coating may be applied by the usual techniques such as dipping, spraying, spreading, roller-coating, etc.

Example 1

The following ingredients were charged to a 5-gallon stainless steel vessel equipped with an anchor-type agitator adapted to rotate at 400 R. P. M., after sweeping the reactor with nitrogen.

| | Parts by weight |
|---|---|
| Distilled water | 67 |
| n-Butyl vinyl ether | 46.3 |
| CTFE | 53.7 |
| MP635S | 2.0 |
| Triton X–45 | 2.0 |
| Borax | 1.0 |
| $K_2S_2O_8$ | 0.5 |

Triton X–45 is an alkylated aryl polyether alcohol (reaction product of 4 to 5 moles of ethylene oxide and 1 mole of iso-octyl phenol), and the MP635S a sodium alkane sulfonate (sodium sulfonate of white oil, $C_{16}$–$C_{20}$, kerosene cut). The temperature was adjusted to 105° F. and held there until the end of the induction period (30 minutes), and then the polymerization was allowed to proceed at 90° F. until the solids content reached 56 percent, namely about four hours after the induction period.

The latex was subsequently vacuum stripped at about 110 to 115° F. to remove all of the unreacted monomer.

Example 2

A similar reaction was carried out in a 2-gallon glass-lined reactor equipped with an anchor-type agitator of 275 R. P. M., using the above techniques, and using the following monomer charges in place of the monomers of Example 1, the other reagents being the same:

| | Parts by weight |
|---|---|
| 2-ethylhexyl vinyl ether | 57 |
| CTFE | 43 |

Example 3

A polymer was prepared as in Example 1 except that the CTFE was added in three equal increments, namely in the original charge and at 3 and 6 hours after the commencement of the reaction, in order to temper the velocity of the polymerization reaction and to cut down the amount of prefloc formed. In this case the reaction was carried out during a period of eight hours.

Example 4

A polymer was prepared as in Example 2, except that 100 parts of water was used. To 100 parts (on the solid basis) of this latex were added the following ingredients:

| | Parts by weight |
|---|---|
| Vinyl chloride | 25 |
| MP635S | 1 |
| $K_2S_2O_8$ | 0.5 |

The graft copolymerization was carried out at 50° C. until 20 parts of the 25 parts of vinyl chloride charged had reacted.

Examples 5–10

The foregoing recipes were varied and graft copolymers of the 2-ethylhexyl vinyl ether and CTFE copolymer, were prepared using the following proportions of materials (the amounts of the reagents not mentioned being the same as in the foregoing):

| Example | Copolymer Charge | | | Vinyl Chloride | Total Solids, percent |
|---|---|---|---|---|---|
| | Water | CTFE | Ether | | |
| 5 | 80 | 57 | 43 | 20 | 54.3 |
| 6 | 90 | 57 | 43 | 33 | 54.6 |
| 7 | 80 | 45 | 55 | 27 | 55.6 |
| 8 | 90 | 45 | 55 | 34 | 53.8 |
| 9 | 110 | 45 | 55 | 52 | 53.6 |
| 10 | 90 | 40 | 60 | 34 | 52.5 |

The foregoing figures refer to parts by weight.

DIPPING

To 200 parts of latex prepared according to Example 1, was added 1 part sodium lauryl sulfate and 1 part of medium viscosity polyvinyl alcohol (Elvanol 71–24).

A cotton glove liner was placed on a porcelain glove form and singed well with a flame to remove linters. The glove was then given a short dip to the finger crotch, then a dip to the thumb crotch, then to the wrist, and finally to the top of the glove. This was done to prevent the latex striking through the fabric. Not much drying time was needed for these first dips. The first full dip, however, was dried to a point where the latex no longer flowed. After six coats were applied the glove was allower to dry on the form overnight at room temperature. It was further dried for several hours at 50° C. A final drying at 70° C. was done off the form. The film thickness on this glove was 18 mils.

The same procedure was used for dipping in latexes of graft copolymers.

The acid resistance of different films prepared in this manner on cotton fabric was tested by placing the coated fabric in a cell between the acid and an indicator solution and observing the time necessary for the first color change of the indicator. The time in minutes per mil of coating thickness for this color change is shown in the following table:

| | RFHNO₃[1] 20% NO₂ | RFHNO₃[2] 7% NO₂ | MIXED ACIDS[3] | WFHNO₃[4] |
|---|---|---|---|---|
| Copolymer of Example 1 | 4 | 6 | 6 | 4 |
| Copolymer of Example 2 | 5 | 9 | 15 | 6 |
| Graft copolymer of Example 4 | 4 | | | |

[1] Red fuming nitric acid with 20% excess of NO₂.
[2] Red fuming nitric acid with 7% excess NO₂.
[3] A mixture of 85% white fuming nitric acid and 15% concentrated sulfuric acid.
[4] White fuming nitric acid.

The invention is defined in the claims which follow.
What I claim is:
1. Graft copolymer of ethenically unsaturated monomer polymerized on to copolymer of chlorotrifluoroethylene and an alkyl vinyl ether, said ethenically unsaturated monomer being from the class consisting of vinyl chloride, vinyl acetate, vinylidene chloride, methyl methacrylate, acrylonitrile and styrene.

2. Latex of graft copolymer of vinyl chloride polymerized on to copolymer of chlorotrifluoroethylene and an alkyl vinyl ether, the alkyl group of which contains 3 to 9 carbon atoms.

3. A flexible base material coated with graft copolymer prepared by polymerizing vinyl chloride on a copolymer of chlorotrifluoroethylene and an alkyl vinyl ether, the alkyl group of which contains 3 to 9 carbon atoms.

4. Clothing composed of fabric coated with graft copolymer of 10 to 25 percent by weight of vinyl chloride polymerized on 90 to 75 percent by weight of copolymer of chlorotrifluoroethylene and an alkyl vinyl ether, the alkyl group of which contains 3 to 9 carbon atoms.

5. Graft copolymer of 10 to 25 percent by weight of vinyl chloride polymerized on 90 to 75 percent by weight of copolymer of chlorotrifluoroethylene and an alkyl vinyl ether, the alkyl group of which contains 3 to 9 carbon atoms.

6. Graft copolymer of 10 to 25 percent by weight of vinyl chloride polymerized on 90 to 75 percent by weight of copolymer of chlorotrifluoroethylene and an alkyl vinyl ether, the alkyl group of which contains 6 to 9 carbon atoms.

7. The process of preparing a coated fabric which comprises copolymerizing 0.1 to 0.9 mole of alkyl vinyl ether, the alkyl group of which contains 3 to 9 carbon atoms, and 0.9 to 1.0 mole of chlorotrifluoroethylene in an emulsion and producing a copolymer in which the content of ether is not greater than one mole thereof for each mole of chlorotrifluoroethylene, polymerizing vinyl chloride onto the resulting copolymer to produce a composition in which there is 10 to 25 parts by weight of vinyl chloride to 90 to 75 parts by weight of copolymer, and coating fabric with the resulting emulsion.

8. The process of making a glove which comprises copolymerizing 0.1 to 9.0 mole of alkyl vinyl ether, the alkyl group of which contains 6 to 9 carbon atoms, and 0.9 to 1.0 mole of chlorotrifluoroethylene in an emulsion and producing a copolymer in which the ether content is not greater than one mole thereof for each mole of chlorotrifluoroethylene, polymerizing vinyl chloride onto the copolymer to produce graft copolymer in which there is 10 to 25 parts by weight of vinyl chloride to 90 to 75 parts by weight of copolymer, dipping into the resulting emulsion a glove form covered with fabric and depositing graft copolymer on the fabric, and then removing the coated fabric from the form.

References Cited in the file of this patent

UNITED STATES PATENTS

| | | |
|---|---|---|
| 2,083,684 | Burke | June 15, 1937 |
| 2,293,927 | Beal | Aug. 25, 1942 |
| 2,327,625 | Dickson | Aug. 24, 1943 |
| 2,479,367 | Joyce | Aug. 16, 1949 |
| 2,686,767 | Green | Aug. 17, 1954 |

FOREIGN PATENTS

| | | |
|---|---|---|
| 679,562 | Great Britain | Sept. 17, 1952 |